United States Patent [19]

Imabayashi et al.

[11] Patent Number: 5,037,907
[45] Date of Patent: Aug. 6, 1991

[54] PROCESS FOR PRODUCING MAINLY SYNDIOTACTIC STYRENE-BASED POLYMERS

[75] Inventors: Hideki Imabayashi; Kazutoshi Ishikawa; Koji Yamamoto; Takashi Izumi, all of Ichihara, Japan

[73] Assignee: Idemitsu Petrochemical Co., Ltd., Tokyo, Japan

[21] Appl. No.: 402,349

[22] Filed: Sep. 1, 1989

[30] Foreign Application Priority Data

Sep. 28, 1988 [JP] Japan .................................. 63-241144

[51] Int. Cl.$^5$ ......................... C08F 2/02; C08F 12/08
[52] U.S. Cl. ...................................... 526/88; 526/346; 526/347.21902
[58] Field of Search ............... 526/87, 88, 346, 347.2, 526/902

[56] References Cited

U.S. PATENT DOCUMENTS

| | | | |
|---|---|---|---|
| 3,054,783 | 9/1962 | Lashua | 526/88 X |
| 3,838,139 | 9/1974 | Latinen | 526/346 X |
| 4,680,353 | 7/1987 | Ishihara et al. | 526/160 |
| 4,774,301 | 9/1988 | Campbell, Jr. et al. | 526/347.2 X |
| 4,808,680 | 2/1989 | Schmidt et al. | 526/347.1 X |

FOREIGN PATENT DOCUMENTS 0224097 6/1987 European Pat. Off. ............ 526/160

*Primary Examiner*—Fred Teskin
*Attorney, Agent, or Firm*—Fishauf, Holtz, Goodman & Woodward

[57] ABSTRACT

A process for continuously producing a styrene-based polymer having high syndiotactic configuration which comprises continuously introducing a •styrene-based monomer into a reactor and polymerizing to while adjusting the amount of the polymer produced in the reactor to at least 10% by weight of the total amount of the unreacted styrene-based monomer and the polymer.

According to the present invention, the styrene-based polymer with high syndiotactic configuration is effectively produced with small power consumption.

6 Claims, 1 Drawing Sheet

PROCESS FOR PRODUCING MAINLY SYNDIOTACTIC STYRENE-BASED POLYMERS

BACKGROUND OF THE INVENTION

1. Field of the Invention

The present invention relates to a process for producing styrene-based polymers. More particularly it relates to a process for producing styrene-based polymers having a stereostructure in which chains are mainly in syndiotactic configuration.

2. Description of the Related Arts

Conventionally, styrene-based polymers having stereostructure which are atactic or isotactic are well known, but recently styrene-based polymers having a stereostructure of mainly syndiotactic configuration have been developed, one of which, for example, is disclosed in Japanese Patent Application Laid-Open No. 187708/1987.

However, almost all the processes for producing styrene-based polymers having syndiotactic configuration have conventionally been carried out by a batch system in which a tank type reactor provided with agitating blades, etc. has been used and insufficient investigation has been done with respect to continuous polymerization techniques.

SUMMARY OF THE INVENTION

An object of the present invention is to provide a process in which polymerization can be continuously performed to produce styrene-based polymer having high syndiotactic configuration.

Another object of the present invention is to provide a process which can produce the styrene-based polymer without adhering to the reactor nor gelation of the polymer. Still another object of the present invention is to provide a process for producing the styrene-based polymer which can perform stable production with low power consumption.

The present invention provides a process for continuously producing a styrene-based polymer having high syndiotactic configuration which comprises continuously introducing a styrene-based monomer into a reactor and polymerizing it while controlling the amount of the polymer present in the reactor to at least 10% by weight of the total amount of the unreacted styrene-based monomer and the polymer.

DESCRIPTION OF THE PREFERRED EMBODIMENTS

Figure 1:
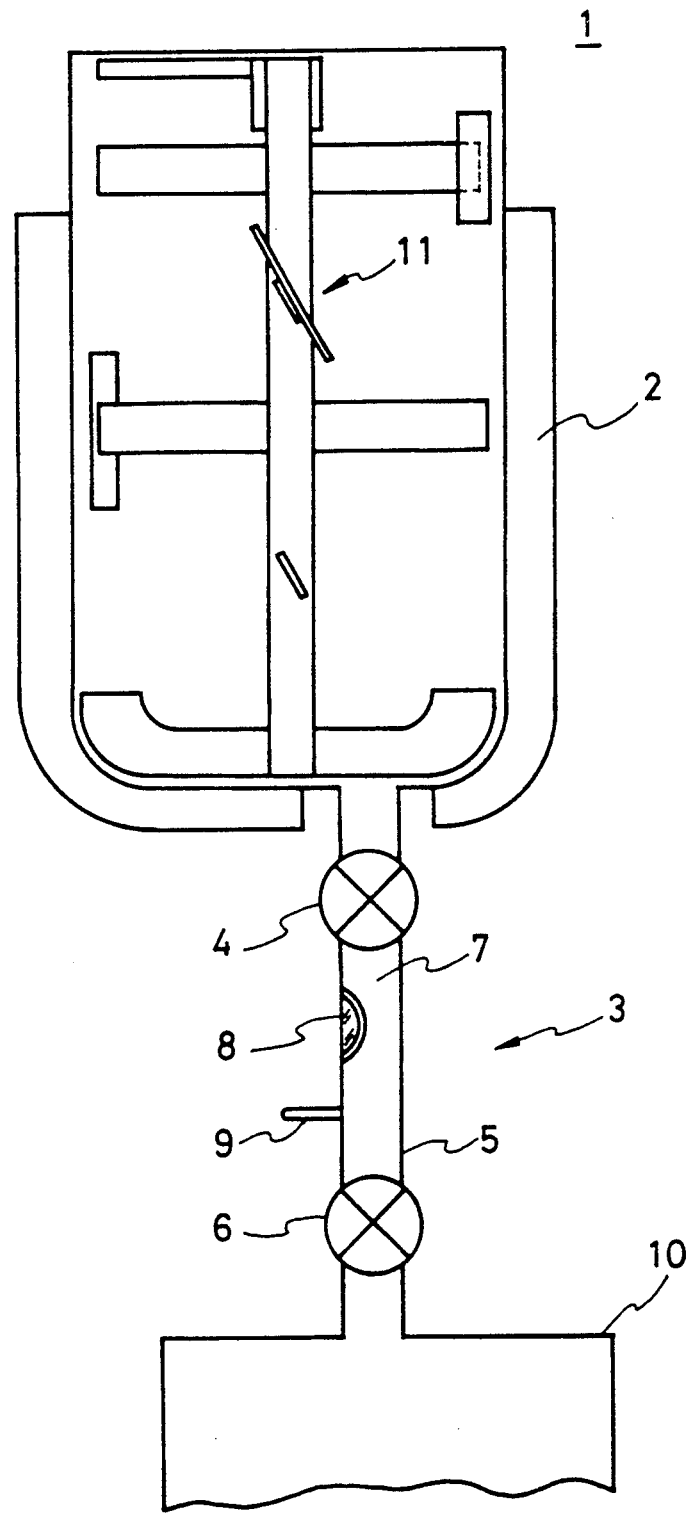
FIG. 1 illustrates a reactor used in Examples of the present invention and Comparative example.

The polymer produced in the present invention is a styrene-based polymer having high syndiotactic configuration. The styrene-based polymer having high syndiotactic configuration means that the polymer has a stereostructure with a configuration that is high syndiotactic, i.e., the stereostructure in which phenyl groups or substituted phenyl groups as side chains are located alternately at opposite directions relative to the main chain consisting of carbon-carbon bonds. The tacticity is quantitatively determined by the nuclear magnetic resonance method using carbon isotope $^{13}$C-NMR method). The tacticity as determined by the $^{13}$C-NMR method can be indicated in terms of proportions of structural units continuously connected to each other, i.e., a diad in which two structural units are connected to each other, a triad in which three structural units are connected to each other, or pentad in which five structural units are connected to each other. Styrene-based polymers having high syndiotactic configuration of the present invention include polystyrene, poly(alkylstyrene), poly(halogenated styrene), poly(alkoxystyrene), poly(vinyl benzoate) and the mixtures thereof, and copolymers containing the above polymers as the main component, having such a syndiotacticity that the proportion of racemic diad is at least 75% and preferably at least 85%, or the proportion of racemic pentad is at least 30% and preferably at least 50%.

The above poly(alkylstyrene) includes poly(methylstyrene), poly(ethylstyrene), poly(isopropylstyrene), poly(tert-butylstyrene) and the like. Specific examples of the poly(halogenated styrene) are poly(chlorostyrene), poly(bromostyrene), poly(fluorostyrene) and the like. The poly(alkoxystyrene) includes poly(methoxystyrene), poly(ethoxystyrene) and the like. The most preferred styrene-based polymers are polystyrene, poly(p-methylstyrene), poly(m-methylstyrene), poly(p-tert-butylstyrene), poly(p-chlorostyrene), poly(m-chlorostyrene), poly(p-fluorostyrene), and a copolymer of styrene and p-methylstyrene.

The styrene-based polymers produced by the present invention generally have a weight average molecular weight of 5,000 or more, preferably 10,000 to 20,000,000, and a number average molecular weight of 2,500 or more, preferably 5,000 to 10,000,000, and have high syndiotacticity. After polymerization, depending on necessity, if the resulting polymer is subjected to de-ashing treatment with a washing solution containing hydrochloric acid, etc., and after via washing and drying under reduced pressure, further washing with a solvent such as methyl ethyl ketone, etc. to remove soluble components and then treating the resulting insolubles by use of chloroform, etc., high purity styrene-based polymers having extremely high syndiotacticity can be obtained.

Such a styrene-based polymer having high syndiotactic configuration can be obtained, for example, by polymerizing a styrene-based monomer (corresponding to the desired styrene-based resin) with a catalyst comprising a titanium compound, and a reaction product of an organic aluminum compound and a condensing agent, in the presence or absence of an inert hydrocarbon solvent (Japanese Patent Application Laid-Open No. 187708/1987).

Various titanium compounds can be used as one component of the catalyst. Titanium compounds and titanium chelate compounds represented by the general formula (I) or (II) are preferably used:

$$\text{TiR}^1_a\text{R}^2_b\text{R}^3_c\text{R}^4{}_{4-(a+b+c)} \quad (I)$$

or

$$\text{TiR}^1_d\text{R}^2_e\text{R}^3{}_{3-(d+e)} \quad (II)$$

wherein $R^1$, $R^2$, $R^3$ and $R^4$ are independently a hydrogen atom, an alkyl group having 1 to 20 carbon atoms, an alkoxy group having 1 to 20 carbon atoms, an aryl group having 6 to 20 carbon atoms, an alkylaryl group, an arylalkyl group, an acyloxy group having 1 to 20 carbon atoms, a cyclopentadienyl group, a substituted cyclopentadienyl group, an indenyl group, or a halogen atom, a, b and c are independently an integer of 0 to 4 satisfying $0 \leq a+b+c \leq 4$, and d and e are independently an integer of 0 to 3 satisfying $0 \leq d+e \leq 3$.

As described above, $R^1$, $R^2$, $R^3$ and $R^4$ of the general formula (I) or (II) are independently a hydrogen atom, an alkyl group having 1 to 20 carbon atoms (specifically a methyl group, an ethyl group, a propyl group, a butyl group, an amyl group, an isoamyl group, an isobutyl group, an octyl group, a 2-ethylhexyl group and the like), an alkoxy group having 1 to 20 carbon atoms (specifically a methoxy group, an ethoxy group, a propoxy group, a butoxy group, an amyloxy group, a hexyloxy group, a 2-ethylhexyloxy group, and the like), an aryl group having 6 to 20 carbon atoms, an alkylaryl group, an arylalkyl group (specifically a phenyl group, a tolyl group, a xylyl group, a benzyl group and the like), an acyloxy group having 1 to 20 carbon atoms (specifically a heptadecylcarbonyloxy group and the like), a cyclopentadienyl group, a substituted cyclopentadienyl group (specifically a methylcyclopentadienyl group, a 1,2-dimethylcyclopentadienyl group, a pentamethylcyclopentadienyl group and the like), an indenyl group or a halogen atom, (e.g., chlorine, bromine, iodiene and fluorine). $R^1$, $R^2$, $R^3$ and $R^4$ may be the same or different.

Specific examples of the tetravalent titanium compounds and titanium chelate compounds represented by the general formula (I) are methyltitanium trichloride, titanium tetramethoxide, titanium tetraethoxide, titaniummonoisopropoxy trichloride, titaniumdiisopropoxy dichloride, titaniumtriisopropoxy monochloride, tetra(2-ethylhexyloxy)titanium, cyclopentadienyltitanium trichloride, biscyclopentadienyltitanium dichloride, cyclopentadienyltitanium trimethoxide, cyclopentadienyl trimethyltitanium, pentamethylcyclopentadienyltitanium trimethoxide, pentamethylcyclopentadienyl trimethyltitanium, titanium tetrachloride, titanium tetrabromide, bis(2,4-pentanedionate)titanium oxide, bis(2,4-pentanedionate)titanium dichloride, bis(2,4-pentanedionate)titanium dibutoxide, and the like. In addition, as the titanium compound, condensed titanium compounds represented by the general formula (III):

(wherein $R^5$ and $R^6$ are independently a halogen atom, an alkoxy group having 1 to 20 carbon atoms, or an acyloxy group, and k is an integer of 2 to 20) may be used.

These titanium compounds can be used in the form of complexes with esters, ethers and the like.

Typical examples of the trivalent titanium compounds represented by the general formula (II) which are to be used as one component of the catalyst are titanium trihalide such as titanium trichloride and the like, and cyclopentadienyltitanium compounds such as cyclopentadienyltitanium dichloride and the like. In addition, trivalent titanium compounds as obtained by reducing tetravalent titanium compounds can be used. These trivalent titanium compounds may be used in the form of complexes with esters, ethers and the like.

The reaction product to be used in combination with the above titanium compound is prepared by contacting an organoaluminum compound and a condensing agent.

As the organoaluminum compound to be used, organoaluminum compounds (trialkylaluminum) represented by the general formula (IV):

(wherein $R^7$ is an alkyl group having 1 to 8 carbon atoms) are usually used. Representative examples of the organoaluminum compound of the general formula (IV) are trimethylaluminum, triethylaluminum and triisobutylaluminum. Of these compounds, trimethylaluminum is most preferred.

A typical example of the condensing agent to be reacted with the above organoaluminum compound is water. In addition, any compounds can be used as long as they undergo a condensation reaction with alkylaluminum compounds.

An example of the reaction product between an alkylaluminum compound, which is a typical example of the organoaluminum compound component, and water is cyclic alkylaluminoxane represented by the following general formula (V):

(wherein $R^8$ is an alkyl group having 1 to 8 carbon atoms, and j is a number of 2 to 50).

Another example of the reaction product is chain-like alkylaluminoxane represented by the following general formula (VI).

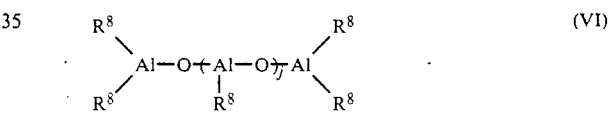

(wherein $R^8$ and j are the same as defined above).

In general, the reaction product of the organoaluminum compound (e.g., trialkylaluminum) and water contains various compounds, the type of which varies depending on contacting conditions. For example, when the organoaluminum compound is trialkylaluminum, the reaction product is a mixture of the aforementioned chain-like alkylaluminoxane (e.g., chain-like methylaluminoxane) and cyclic alkylaluminoxane (e.g., cyclic methylaluminoxane), unreacted trialkylaluminum, and other condensates, or a molecule resulting from association in a complicated manner of the above mixture.

These alkylaluminoxanes can be prepared by various methods. For example, (1) a method in which alkylaluminum is dissolved in an organic solvent and then contacted with water, (2) a method in which alkylaluminum is first added at the time of polymerization and then water is added, and (3) a method in which alkylaluminum is reacted with the water of crystallization as contained in metal salts and the like, or water absorbed in inorganic or organic materials. The above water may contain ammonia, amines such as ethylamine and the like, sulfur compounds such as hydrogen sulfide and the like, or phosphorus compounds such as phosphorous acid esters and the like in the proportion of less than 20%.

When this is used as a catalyst, the above reaction product (contact product) can be used singly, or can be used in combination with the above organic aluminum compound or the other organic metal compound, or in the form of deposition or adsorption of the reaction product to an inorganic material, etc.

The ratio of the titanium compound and the reaction product of the organic aluminum compound and the condensing agent is optionally set depending on kinds of the styrene-based monomer (styrene or styrene derivative) to be polymerized, kinds of catalyst components, and other conditions. As the catalysts, other catalyst components may also be added.

In the present invention, polymerization reaction is effected by agitating the starting material (styrene-based monomer) and catalyst preferably at a temperature lower than the fusing point of polymers, that is, at a temperature of not higher than 110° C., preferably 0° to 90° C. while providing shearing force enough to maintain a polydispersive state, so as to make a substantially solid-state polydispersoid, and thus styrene-based polymers having syndiotactic configuration are produced.

Herein agitation at polymerization reaction has three stages: i) agitation in a low viscosity state at polymerization temperature where monomers, oligomers and polymers are in liquid form, a part of the polymers is in slurry form without becoming liquid in monomers, or polymers containing other solvents are substantially in liquid form, ii) agitation in a highly viscous state with providing shearing force, as polymerization proceeds, and iii) lastly agitation of solid-state polydispersoid when substantially the whole has become polydispersive.

Accordingly, in order to continuously produce styrene-based polymers having high syndiotactic configuration, it is desired to maintain the agitating state to an appropriate state. That is, when almost all the reaction mixture in the reactor are in the liquid state of the above (i), the amount of unreacted monomer is large so that the amount of monomers contained in the polymers discharged from the reactor is increased and hence load of separation and recovery of the monomers is also increased, whereby production efficiency is lowered. Also, in the highly viscous state of (ii), agitation force (stirring force) is increased and in an extreme case, the reaction mixture becomes gel state so that formation of macromolecular particles or adhesion of polymers to the reactor or the agitating blades are caused and the continuous operation sometimes becomes difficult.

Therefore, it is desired that polymerization proceed continuously by making the state in the reactor into the above state (iii), that is, the majority being solid polydispersed material. Such a state in the reactor can be accomplished by controlling amounts of monomers and/or a catalyst to be fed into the reactor and the amount of formed polymers to be discharged from the reactor to adjust the ratio of the formed polymers in the reactor to 10% by weight or more, preferably 25% by weight or more, more preferably within the range of 40 to 80% by weight based on the total amount of the monomers and the polymers. The above feed amount and discharged amount are optionally determined depending on kinds of starting monomers or catalyst, polymerization temperature, stirring rate, capacity of the reactor and other various conditions, and they should be set at an optimum conditions in view of various conditions.

Thus, the state in the reactor can be made into a state in which the solid polydispersed material is usually stirred by controlling the ratio of polymer formed in the reactor, i.e. conversion ration of monomers in the reactor. As the result, agitating power can be reduced, and formation of macromolecular particles or adhesion of the formed polymers to the reactor or agitating blades can be prevented. It is possible to carry out the reaction by maintaining the ratio of the above formed polymer at 80% by weight or more, but residence time in the reactor becomes long and the ratio of the starting monomers decreases so that there is a fear that capacity efficiency of the reactor will be lowered.

Here, as the reactor, it is preferred to use a complete mixing tank type polymerization apparatus which is commonly employed and can control temperatures therein. Shapes of the apparatus are not limited. Also, the agitating blades provided in the reactor are not particularly limited so long as they can sufficiently carry out powder mixing. For example, multi-step paddle type blade and helical ribbon type blade can be used. Regarding the reactor, a single stage reactor or a multistage reactor in which two or more reaction regions are connected in series can be used in the polymerization.

Supply of the starting monomer or catalyst to the reactor can be carried out continuously with a constant rate by a positive displacement pump, but can be fed intermittently at predetermined times in predetermined amounts by a calibration pot. Similarly, discharge of the formed polymers from the reactor can be carried out continuously or intermittently. When discharge of the polymers is carried out intermittently, it can be done, for example, by providing a drawn nozzle at a bottom of the reactor and opening and shutting it intermittently. Also, when discharge is carried out continuously, it can be done by a screw feeder, etc.

Also, initiating the process for producing styrene-based polymers having syndiotactic configuration of the present invention can be performed, for example, by the following two means.

As the first means, there can be mentioned a method in which conventional batch polymerization is firstly performed and after the mixture in the reactor reaches a powder state, feeding the starting materials and discharge of the formed polymers are initiated. That is, in this method, predetermined amounts of styrene-based monomer are introduced into a dried reactor, and the temperature in the reactor is elevated to polymerization temperature and then prescribed amounts of a catalyst, etc. are added thereto to effect conventional batch polymerization. After that, when the ratio of the polymer in the reactor becomes a predetermined amount of 10% by weight or more and the content of the reactor becomes powder state, styrene monomers and a catalyst are fed at a constant rate and at the same time, discharge of formed styrene-based polymer powder having syndiotactic configuration from the reactor is initiated.

As the second means, there can be mentioned a method in which styrene-based polymer powder having syndiotactic configuration to be a base of a powder bed (uniform dispersion medium of catalyst), or resin powder such as polypropylene powder, polyethylene powder, etc., or inorganic powder such as silica, etc., as uniform dispersion medium of catalyst is firstly placed in the reactor, and after effecting sufficient drying and pre-treatment of powder, feeding of starting monomers and discharging the polymer formed are initiated. That is, in the second means, prescribed amounts of styrene-based polymers having syndiotactic configuration which are uniform dispersion medium of catalyst are placed in the dried reactor, and, if necessary, an inert gas is introduced therein, or vacuum drying or alkyl aluminum treatment is effected to remove water, etc. which works as a catalyst poison. After that, the temperature in the reactor is elevated to polymerization temperature while stirring and feeding starting monomers and a catalyst into the reactor is initiated at a constant rate, at the same time discharging the formed polymer powder from the reactor is initiated.

When continuous running is initiated in either of the above methods, an amount of formed polymer in the reactor can be maintained in a predetermined ratio of 10% by weight or more as mentioned above by controlling the feed amount of the starting monomers or catalysts and discharged amount of the formed polymer thereafter. As the result, it becomes possible to produce the styrene-based polymer having high syndiotactic configuration continuously with a small stirring power without formation of macromolecular particles nor adhesion of polymers, etc. to the reactor or agitating blades.

As explained above, according to the present invention, stable operation with a low power consumption due to powder stirring can be performed without adhesion of polymers to the reactor nor formation of macromolecular particles, and styrene-based polymers having high syndiotactic configuration can be prepared continuously and easily.

Accordingly, the present invention is expected to be used effectively as an industrial producing method of the styrene-based polymers having high syndiotactic configuration.

The present invention is described in greater detail with reference to the following examples.

First, the reactor used in the following Examples and Comparative example is described by referring to FIG. 1.

The reactor 1 is a tank type polymerization apparatus with an inner diameter of 435 mm, height of 740 mm, and volume of 100 liters, having a jacket 2 for temperature control at the peripheral portion thereof, which effects heating and cooling. At the bottom of the reactor 1, a discharge mechanism 3 is provided, from which polymer powder formed by polymerization is discharged.

This discharge mechanism 3 comprises a short pipe 5 having a diameter of 4 inches and a length of 440 mm connected to a tank valve 4 at the bottom of the reactor 1, a ball valve 6 provided at the bottom portion of the short pipe 5, and a discharge room 7 having a volume of 3.5 liters formed in the short pipe 5 between both of valves 4 and 6. A peephole 8 for inside observation and a nitrogen gas nozzle 9 are provided in the discharge room 7.

By providing such a discharge mechanism 3, powder in the reactor 1 is dropped into the discharge room 7 by opening and then shutting the tank valve 4 and then opening the ball valve 6 so that 3.5 liters of powder per each operation can be transferred to a powder accepting tank 10 at downward. These operations are made so as to effect automatically by using a timer.

Also, as the agitating blade 11 which is provided capable of rotating in the reactor 1, a five step paddle blade in which the lowermost portion is made an anchor blade is used.

Regarding a positive displacement pump for feeding starting materials, a catalyst measuring tank and other apparatus which are other than those shown in the figure, those conventionally used in this kind of apparatus are optionally used.

EXAMPLE 1

A cleaned reactor was elevated to 90° C. and dried under vacuum for 3 hours. Then, after returning pressure in the reactor with nitrogen gas, it was cooled to 50° C. Subsequently, into the reactor were charged 30 liters of styrene monomer in which the water content had been lowered to 7 weight ppm by previously passing dried nitrogen gas therethrough. After elevating a temperature of the styrene monomer to 75° C. while stirring at a rate of 30 rpm, 330 mmole of triisobutylaluminum was fed from a catalyst measuring tank and further 330 mmole of polymethylaminoxane was fed from the catalyst measuring tank, followed by stirring for 30 minutes. Thereafter, 1.7 mmole of pentamethylcyclopentadienyl trimethoxy titanium was fed from the catalyst measuring tank, and the stirring rate was raised to 210 rpm to initiate batch bulk polymerization of the styrene-based polymers having syndiotactic configuration.

In this instance, by using the above reactor 1, experiment of batch bulk polymerization was previously done with the above catalysts and under the above polymerization conditions and it was confirmed that the conversion rate of the monomers after 2 hours is about 30%.

After 2 hours from initiation of polymerization, continuous feed of the styrene monomer was started at a ratio of 10 liters per hour by using a positive displacement pump and at the same time, feed pumps (positive displacement pumps) of each catalyst were also started. Feed rate of each catalyst were as follows:

| | |
|---|---|
| Triisobutylaluminum | 82.0 mmole/hr., |
| Polymethylaluminoxane | 82.0 mmole/hr.. |
| Pentamethylcyclopentadienyltrimethoxy titanium | 0.412 mmole/hr |

Further, intermittent discharge of powder was initiated by driving a discharge mechanism.

After 30 minutes from the start of continuous running, rotational speed was made 120 rpm.

The styrene-based polymers obtained by the above continuous running were as follows.

| | |
|---|---|
| Powder discharge frequency | 1 time/5 minutes, |
| Powder forming rate | 9.2 kg/hr., |
| Powder bulk density | 0.32 g/cc, |
| Conversion (ratio of polymer) | 28.0%, |
| Syndiotacticity | 98.0%, |
| Weight average molecular weight of the polymer | 765,000 |

After 9 hours from the start of continuous running, when feeding of monomers and catalyst was stopped and the reactor was opened, substantially no adhesion of the starting materials, polymers, etc. to a wall of the reactor, agitating blades, etc. was detected except for at the neighbor of monomer inlet portion and catalyst feed opening. Also, no formation of macromolecular particles, which makes it impossible to discharge from the discharge mechanism, was detected.

COMPARATIVE EXAMPLE

In the same manner as in Example 1, batch bulk polymerization was carried out and continuous polymerization was started in the same manner except for changing the feeding rate of the catalysts after 2 hours as shown below.

| Triisobutylaluminum | 36.9 mmole/hr., |
|---|---|
| Polymethylaluminoxane | 36.9 mmole/hr., |
| Pentamethylcyclopentadienyltrimethoxy titanium | 0.185 mmole/hr. |

However, from about 80 minutes after the start of the continuous running, discharge of powder could not be carried out smoothly by automatic operation. When observed inside from the peephole of the discharge room, the powder was wet.

When a further 50 minutes passed, the discharge of powder became more difficult. Then the valve was allowed to open for a long time with changing the discharge mechanism to manual operation but discharge of powder became impossible. When feeding of monomers and catalyst was stopped and the reactor was opened, there was semitransparent bulk material in the reactor and it was a gel partially containing powder precipitates. Also, many masses with a size of 10 cm or so were adhered to the agitating blades and the upper portion of inner wall.

The ratio of the polymer to the whole contact was measured as 8.3%.

EXAMPLE 2

Batch bulk polymerization was carried out in the same manner as in Example 1, and continuous running operation was carried out substantially the same as in Example 1 except for feeding continuously, after 2 hours, styrene monomer containing 5% by volume of hexane at a rate of 10 liters/hr and for changing the feeding amounts of catalysts as shown below.

| Triisobutylaluminum | 162.0 mmole/hr., |
|---|---|
| Polymethylaluminoxane | 162.0 mmole/hr., |
| Pentamethylcyclopentadienyltrimethoxy titanium | 0.831 mmole/hr. |

Temperature control at continuous polymerization was carried out by a jacket as well as reflux of an overhead condenser provided at an upper portion of the reactor. Pressure in the reactor was 0.18 kg/cm$^2$.

Characteristics of the styrene-based polymer powder thus obtained were as follows.

| Powder discharge frequency | 1 time/6 minutes, |
|---|---|
| Powder forming rate | 9.0 kg/hr., |
| Powder bulk density | 0.38 g/cc, |
| Conversion | 49.0%, |
| Syndiotacticity | 96.1%, |
| Weight average molecular weight of the polymer | 695,000 |

After 8 hours from starting continuous running, feeding of monomers and catalyst was stopped and the reactor was opened, as in Example 1. Almost no adhesion of the starting materials, polymers, etc. to the wall of the reactor, agitating blades, etc. was detected except for at the neighbor of the monomer inlet portion and catalyst feed opening. Also, no formation of macromolecular particles, which makes it impossible to discharge from the discharge mechanism, was detected.

What is claimed is:

1. In a process for continuously producing a styrene polymer having high syndiotactic configuration by polymerizing a styrene monomer in the presence of a catalyst, the improvement which comprises
   continuously introducing the styrene monomer into a reactor;
   continuously polymerizing the monomer to form the styrene polymer at a temperature lower than the fusing point of the styrene polymer thereby to form a reaction mixture; and
   maintaining the reaction mixture in a substantially polydispersive state by agitating the mixture in the reactor and by adjusting said continuous introducing of the styrene monomer into the reactor and adjusting a discharging of the reaction mixture from the reactor to rates whereby the amount of the polymer produced in the reactor is at least 10% by weight of the total amount of the unreacted styrene monomer and the polymer in the reactor.

2. The process as defined in claim 1, wherein the amount of the polymer produced in the reactor is adjusted to at least 25% by weight of the total amount of the unreacted styrene monomer and the polymer in the reactor.

3. The process as defined in claim 1, wherein the amount of the polymer produced in the reactor is adjusted to 40 to 80% by weight of the total amount of the unreacted styrene monomer and the polymer in the reactor.

4. A process for continuously producing a styrene polymer having high syndiotactic configuration in a reactor, which comprises batchwise polymerising a styrene monomer until a powdered reaction mixture is formed, and thereafter
   continuously feeding the monomer into the reactor and discharging the formed polymer out of the reactor, said continuous feeding and said discharging being adjusted to rates whereby the amount of the polymer produced in the reactor is at least 10% by weight of the total amount of the unreacted styrene monomer and the polymer in the reactor.

5. The process as defined in claim 4, wherein the amount of the polymer produced in the reactor is adjusted to at least 25% by weight of the total amount of the unreacted styrene monomer and the polymer in the reactor.

6. The process as defined in claim 4, wherein the amount of the polymer produced in the reactor is adjusted to 40 to 80% by weight of the total amount of the unreacted styrene monomer and the polymer in the reactor.

* * * * *